(12) United States Patent
Low et al.

(10) Patent No.: US 6,883,588 B1
(45) Date of Patent: Apr. 26, 2005

(54) SPACECRAFT RADIATOR SYSTEM USING A HEAT PUMP

(75) Inventors: Lenny Low, Hillsborough, CA (US); Randy Pon, San Francisco, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/624,151

(22) Filed: Jul. 24, 2000

(51) Int. Cl.$^7$ .......................... F28D 15/00; F25B 13/00
(52) U.S. Cl. ............ 165/41; 165/104.25; 165/104.27; 165/86; 62/235.1; 62/324.2; 62/324.6; 126/613; 244/173
(58) Field of Search .................. 165/41, 104.22, 165/104.27, 104.25, 86, 104.24, 104.26; 62/235.1, 324.4, 324.1, 324.2, 324.6, 477, 478, 480, 483; 126/613, 635, 636, 646; 244/158 A, 173

(56) References Cited

U.S. PATENT DOCUMENTS

| | | | | |
|---|---|---|---|---|
| 3,749,156 A | * | 7/1973 | Fletcher et al. | |
| 3,903,699 A | * | 9/1975 | Davis | |
| 3,957,030 A | * | 5/1976 | Davis | |
| 4,470,450 A | * | 9/1984 | Bizzell et al. | 165/104.25 |
| 4,492,266 A | * | 1/1985 | Bizzell et al. | 165/104.26 |
| 4,532,778 A | * | 8/1985 | Clark et al. | 62/477 |
| 4,725,023 A | * | 2/1988 | Shiki | 244/158 A |
| 4,756,493 A | * | 7/1988 | Camaret | 165/86 X |
| 4,815,525 A | * | 3/1989 | Readman | 165/41 |
| 4,830,097 A | * | 5/1989 | Tanzer | 165/41 |
| 4,862,708 A | * | 9/1989 | Basiulis | 165/104.22 X |
| 4,957,157 A | * | 9/1990 | Dowdy et al. | 165/41 X |
| 5,036,905 A | * | 8/1991 | Eninger et al. | 165/41 |
| 5,103,897 A | * | 4/1992 | Cullimore et al. | 165/41 X |
| 5,114,101 A | * | 5/1992 | Stern et al. | 244/173 |
| 5,142,884 A | * | 9/1992 | Scaringe et al. | 62/324.4 |
| 5,237,827 A | * | 8/1993 | Tchernev | 62/480 X |
| 5,310,141 A | * | 5/1994 | Homer et al. | 244/158 A X |
| 5,351,746 A | * | 10/1994 | Mackey et al. | 165/41 |
| RE35,710 E | * | 1/1998 | Shinmura | |
| 5,787,969 A | * | 8/1998 | Drolen et al. | 165/41 |
| 5,806,803 A | * | 9/1998 | Watts | |
| 5,897,080 A | * | 4/1999 | Barrett | 244/158 A |
| 6,241,008 B1 | * | 6/2001 | Dunbar | 165/104.26 |
| 6,478,258 B1 | * | 11/2002 | Yee | 165/41 X |
| 2002/0139512 A1 | * | 10/2002 | Low et al. | 165/41 |

* cited by examiner

*Primary Examiner*—Ljiljana Ciric
(74) *Attorney, Agent, or Firm*—Karambelas & Associates

(57) ABSTRACT

Heat dissipating apparatus or system for dissipating heat generated by a payload on a spacecraft having a plurality of surfaces. The system includes at least one radiator-condenser coupled to one or more of the surfaces of the spacecraft and a heat pump including an evaporator, a compressor, and an expansion valve coupled in a closed-loop manner to the radiator-condenser. The system components are coupled together using small diameter, thin- and smooth-walled tubing. The system enables the radiator-condenser to be elevated above the source or payload temperature, and, along with the use of thin walled tubing, reduces the mass of the spacecraft. Because the radiator-condenser temperatures are elevated, multiple surfaces of the spacecraft (west, east, earth and aft) can be effectively used as radiating surfaces.

11 Claims, 1 Drawing Sheet

SPACECRAFT RADIATOR SYSTEM USING A HEAT PUMP

BACKGROUND

The present invention relates generally to satellites or spacecraft, and more specifically, to a spacecraft or satellite radiator system employing a heat pump.

The assignee of the present invention manufactures and deploys spacecraft or satellites into geosynchronous and low earth orbits. Currently deployed spacecraft use heat pipes to dissipate heat generated by payloads on the spacecraft. The heat pipes transfer thermal energy to spacecraft radiator panels where it is radiated into space.

Conventional communication satellite radiator panels using such heat pipes are typically sized individually to reject both the payload and solar dissipation during the solstice seasons. Conventional solutions to this problem are disclosed in U.S. Pat. No. 3,749,156 issued to Fletcher, U.S. Pat. No. 5,351,746 issued to Mackey, and U.S. Pat. No. 5,806,803 issued to Watts.

Furthermore, currently deployed spacecraft use heat pipes (both conventional and loop) to gather and distribute heat to spacecraft radiator panels located on north and south facing surfaces of the spacecraft. Conventional radiator systems use heat pipes to transport heat from the payload mounting location to the spacecraft radiator. These heat pipes systems typically use 0.5" to 0.75" aluminum tubing with an internal groove structure or porous wicks. Conventional heat pipe systems do not enable the spacecraft radiator temperature to be elevated above source temperature. The heat pipe radiator panels are at or below the source or payload temperature.

Heat pumps have been used extensively in terrestrial applications, but have never been used in commercial spacecraft applications. Also, pumped thermal systems are planned for the space station, however, the space station systems do not elevate the temperature of the radiator like the heat pump radiator system of the present invention.

Accordingly, it is an objective of the present invention to provide for improved heat dissipating apparatus comprising a spacecraft or satellite radiator system that employs a heat pump.

SUMMARY OF THE INVENTION

To accomplish the above and other objectives, the present invention provides for a spacecraft or satellite radiator system comprising a heat pump. The present radiator system provides for improved closed loop heat dissipating apparatus for use on a spacecraft or satellite.

The satellite radiator system comprises the heat pump and a radiator-condenser. The heat pump comprises an evaporator, a compressor, and an expansion valve. The heat pump is coupled to the radiator-condenser which radiates heat from the system. The satellite radiator system operates using a fluid such as ammonia, preferably using a reverse Rankine thermodynamic cycle.

More particularly, the evaporator receives heat derived from a payload. The evaporator is coupled to the compressor that is powered by a spacecraft power source such as a solar array. The compressor is coupled to the radiator-condenser, which radiates heat from the system. The expansion valve is coupled between the radiator-condenser and the evaporator to complete the closed loop system.

The heat pump based radiator system allows heat to be gathered from the spacecraft payload and transferred to the radiator-condenser to be dissipated at elevated temperatures. Currently used state-of-the-art spacecraft radiator systems have the radiator temperature either the same or lower than the payload or source temperature. In contrast, the heat pump system employed in the present invention allows the temperature of the radiator-condenser to be elevated, thereby reducing the required area of the spacecraft radiator and the mass of the spacecraft.

Typical spacecraft currently use the north and south faces of the spacecraft as primary radiating surfaces. The other spacecraft surfaces (east, west, earth and aft) are usually not effective as primary radiating surfaces due to high relative solar loading. Using the present heat pump system, spacecraft radiator temperatures can be elevated, and therefore these other surfaces of the spacecraft (west, east, earth and aft) can be effectively used as radiating surfaces.

By enabling all spacecraft surfaces to be used, the overall spacecraft mass and volume can be reduced. This allows greater thermal dissipation capability for a fixed launch vehicle volume which is an advantage.

As was mentioned in the Background section, conventional radiator systems use heat pipes to transport heat from the payload mounting location to the spacecraft radiator using 0.5" to 0.75" aluminum tubing with internal grooves or porous wicks. The present heat pump system can perform the same function with small diameter, thin and smooth walled tubing. The present heat pump system represents a mass savings over conventional heat pipe heat distribution systems.

The heat pipe radiator panels of conventional spacecraft heat dissipating systems are at or below the source or payload temperature as opposed to the present invention which is at elevated temperature. Currently deployed spacecraft use north-south radiating surfaces, while the present invention allows all surfaces of the spacecraft to be in thermal communication and be effectively used as radiators.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
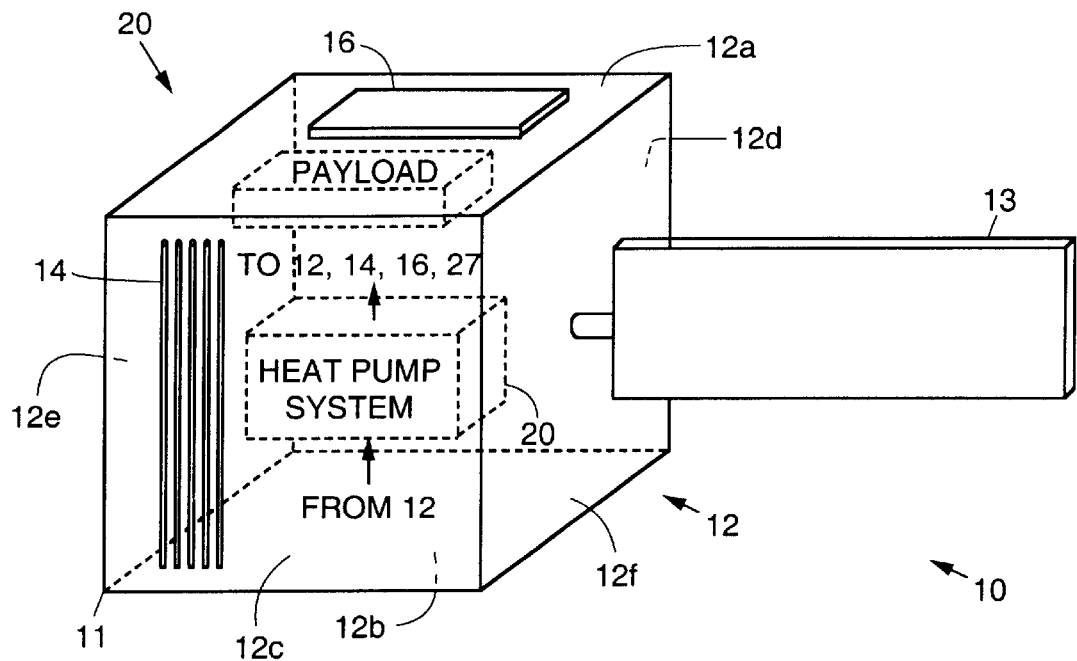
FIG. 1 illustrates an exemplary spacecraft in which the present invention may be employed.

Referring to the drawing figures, FIG. 1 illustrates an exemplary spacecraft 10 in which heat dissipating apparatus 20 or spacecraft radiator system 20 in accordance with the present invention may be employed. The spacecraft 10 has six surfaces 12 (including a north surface 12a, a south surface 12b, an east surface 12c, a west surface 12d, an earth-facing surface 12e and an aft or surface 12f facing away from the earth) and which may have a single or a plurality of deployable radiating surfaces (not shown). The spacecraft 10 has one or more deployable solar arrays 13, one of which is shown.

Some or all of these surfaces 12 are used as heat radiating surfaces for the spacecraft 10. Such surfaces 12 dissipate heat from a payload (such as communication systems, control systems, and electronic instruments, and the like)

disposed on the spacecraft 10. These surfaces 12 have small diameter, thin walled tubing 14 disposed between (embedded), or mounted to, them (only a few of which are shown) which is plumbed to the heat dissipating apparatus 20 or system 20 of the present invention. Details of the heat dissipating apparatus 20 or system 20 are provided with reference to FIG. 2.

Figure 2:
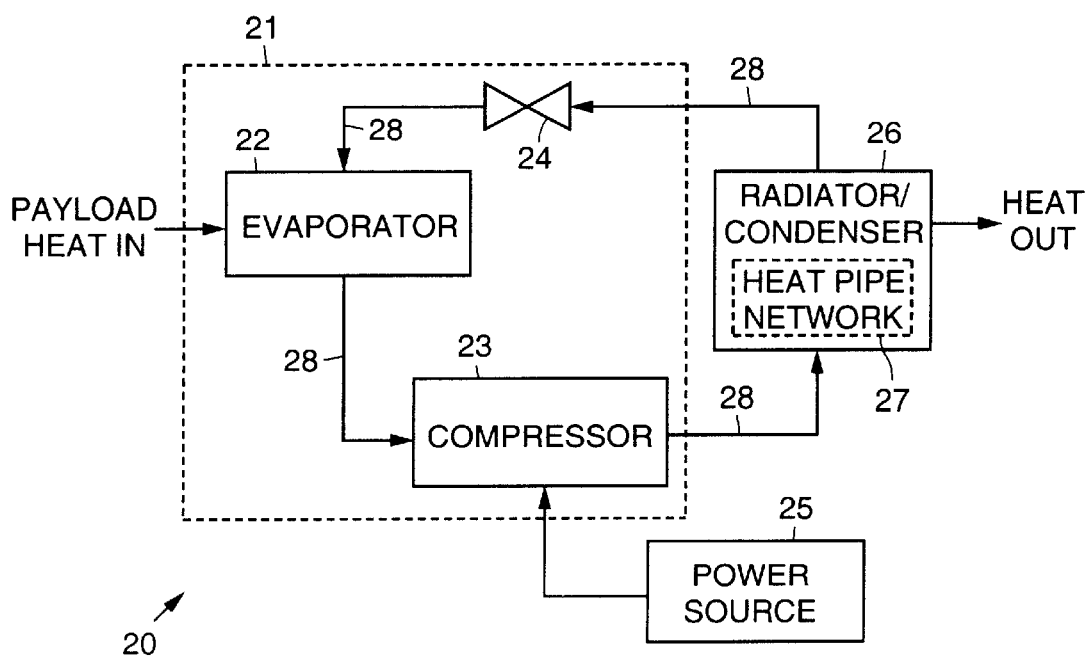
FIG. 2 illustrates an exemplary spacecraft heat pump radiator system in accordance with the principles of the present invention.

Referring to FIG. 2, it illustrates an exemplary spacecraft heat pump radiator system 20, or heat dissipating apparatus 20, in accordance with the principles of the present invention. The heat pump radiator system 20 comprises a heat pump 21 that is coupled in a closed loop to a radiator-condenser 26. The radiator-condenser 26 radiates heat from the system 20 and spacecraft 10. The heat pump radiator system 20 preferably operates using a reverse Rankine thermodynamic cycle. The heat pump radiator system 20 uses a fluid medium to couple heat to the radiator-condenser 26. The fluid medium used in the system 20 may be ammonia, for example.

The heat pump 21 comprises an evaporator 22, a compressor 23, and an expansion valve 24 which are coupled in a closed-loop manner to the radiator-condenser 26 in the manner shown in FIG. 2. The evaporator 22, compressor 23, expansion valve 24 and radiator-condenser 26 are interconnected by way of small diameter, thin and smooth walled tubing 28.

More particularly, the evaporator 22 receives heat derived from a payload. The evaporator 22 is coupled to the compressor 23 which is powered by a spacecraft power source 25 such as the solar array 13. The compressor 23 is coupled to the radiator-condenser 26 disposed on selected surfaces 12 of the spacecraft 10 which radiates heat from the system 20 and spacecraft 10. The expansion valve 24 is coupled between the radiator-condenser and the evaporator to complete the closed loop system.

The heat pump 21 takes heat input to the evaporator 22 from the payload and pumps it to the radiator-condenser 26 by way of the compressor 23, which also elevates the temperature of the fluid above that of the evaporator 22. The expansion valve 24 is used to take the fluid back to its original state and return it to the evaporator 22.

An alternative system 20 would transfer heat from the pumped loop comprising the heat pump 21 and radiator-condenser 26 to a heat pipe network 27 in the radiator-condenser 26 (generally illustrated by the tubing 14 shown in FIG. 1) to distribute the heat throughout the radiator-condenser 26.

Thus, improved heat dissipating apparatus comprising a spacecraft or satellite radiator system that employs a heat pump has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. In a spacecraft having a plurality of surfaces, including at least one radiating surface and at least one solar loaded surface, a heat dissipating system for dissipating heat from a spacecraft payload comprising:

an evaporator which receives a fluid medium heated by said payload, and evaporates said medium producing an evaporated fluid medium at a first operating temperature, a compressor which receives the evaporated fluid medium and compresses the evaporated fluid medium raising the temperature of the evaporated fluid medium to a second operating temperature which is greater than the temperature of the at least one solar loaded surface; and a radiator-condenser which receives the compressed fluid medium from the compressor and radiates the heat from the spacecraft through said radiator-condenser and said at least one solar loaded surface.

2. The system as defined in claim 1 further comprising:

an expansion valve which receives the fluid medium from the radiator-condenser and returns the fluid medium to the evaporator.

3. The system recited in claim 1 wherein selected ones of said at least one solar loaded surface receives heat out from said radiator-condenser through tubing.

4. The system recited in claim 1 wherein the evaporator, compressor, expansion valve and radiator-condenser are interconnected by way of smooth walled tubing.

5. The system recited in claim 1 wherein the compressor is coupled to a spacecraft power source.

6. The system recited in claim 5 wherein the spacecraft power source comprises a solar array.

7. The system recited in claim 1 wherein the fluid medium comprises ammonia.

8. The system recited in claim 1 wherein the compressor comprises means for elevating the temperature of the fluid medium above the temperature of fluid medium in the evaporator.

9. The system recited in claim 1 wherein selected ones of the at least one solar loaded surface receives heat transmitted from said radiator-condenser through tubing embedded in said at least one solar loaded surface.

10. The system recited in claim 1 wherein tubing is mounted to selected ones of said at least one solar loaded surface.

11. The system recited in claim 1 wherein the plurality of surfaces of the spacecraft comprise a north face, a south face, an east face, a west face, an earth-facing surface and a surface facing away from the earth, and wherein the spacecraft comprises at least one deployable radiating surface.

* * * * *